United States Patent
Park et al.

(10) Patent No.: US 9,321,909 B2
(45) Date of Patent: Apr. 26, 2016

(54) RUBBER COMPOSITION FOR TIRE TREAD AND TIRE MANUFACTURED BY USING THE SAME

(71) Applicant: HANKOOK TIRE CO., LTD., Seoul (KR)

(72) Inventors: Won Il Park, Daejeon (KR); Jung Tae Kim, Daejeon (KR)

(73) Assignee: HANKOOK TIRE CO., LTD. (KR)

( * ) Notice: Subject to any disclaimer, the term of this patent is extended or adjusted under 35 U.S.C. 154(b) by 0 days.

(21) Appl. No.: 14/522,571

(22) Filed: Oct. 23, 2014

(65) Prior Publication Data
US 2015/0119504 A1    Apr. 30, 2015

(30) Foreign Application Priority Data

Oct. 31, 2013    (KR) .................. 10-2013-0131132

(51) Int. Cl.
| | |
|---|---|
| *C08L 1/00* | (2006.01) |
| *C08L 5/00* | (2006.01) |
| *C08L 7/00* | (2006.01) |
| *C08J 3/09* | (2006.01) |
| *B60C 1/00* | (2006.01) |
| *C08K 7/02* | (2006.01) |

(52) U.S. Cl.
CPC ... *C08L 7/00* (2013.01); *B60C 1/00* (2013.01); *C08J 3/09* (2013.01); *C08K 7/02* (2013.01); *C08J 2307/00* (2013.01); *C08J 2401/02* (2013.01)

(58) Field of Classification Search
CPC .......... C08L 7/00; C08J 3/09; C08J 2307/00; C08J 2401/02
USPC .......................................... 524/35
See application file for complete search history.

(56) References Cited

U.S. PATENT DOCUMENTS

| | | | | |
|---|---|---|---|---|
| 6,541,627 | B1 * | 4/2003 | Ono | ............... C08J 3/03 106/163.01 |
| 2009/0082492 | A1 | 3/2009 | Klinkenberg et al. | |
| 2009/0082511 | A1 * | 3/2009 | Klinkenberg | ........... C08L 21/00 524/442 |
| 2011/0290149 | A1 * | 12/2011 | Beck | ............. C08B 15/08 106/163.01 |

FOREIGN PATENT DOCUMENTS

| | | |
|---|---|---|
| EP | 2039532 A1 | 3/2009 |
| EP | 2333008 A | 6/2011 |
| JP | 57195101 A | 11/1982 |
| JP | 62285901 A | 12/1987 |
| JP | 2006282923 A | 10/2006 |
| JP | 2009191197 A | 8/2009 |
| JP | 2009191198 A | 8/2009 |
| JP | 2011516386 A | 5/2011 |
| JP | 2012201767 A | 10/2012 |
| JP | 2013018918 A | 1/2013 |
| JP | 2013514399 A | 4/2013 |
| JP | 2013529725 A | 7/2013 |
| JP | 2013166914 A | 8/2013 |
| WO | 2012111408 A1 | 8/2012 |
| WO | 2012127110 A1 | 9/2012 |
| WO | 2014142319 A1 | 9/2014 |

OTHER PUBLICATIONS

Bras et al., Industrial Crops and Products, 32, 627-633, 2010.*
van den Berg et al., Biomacromolecules, 8, 1353-1357, 2007.*
Julien Bras et al., "Mechanical, barrier, and biodegradability properties of bagasse cellulose whiskers reinforced natural rubber nanocomposites," Industrial Crops and Products, Jul. 22, 2010, pp. 627-633, vol. 32 (2010).
Hirota, M. et al., "Water dispersion of cellulose II nanocrystals prepared by TEMPO-mediated oxidation of mercerized cellulose at pH 4.8," published Nov. 21, 2009, Springer, Kluwer Academic Publishers, vol. 17, pp. 279-288.
Cu, Ju, et al., "The Effects of Nanocrystalline Cellulose in the Mechanical and Dynamic Properties of Natural Rubber Reinforced by Carbon Black," China Academic Journal Electronic Publishing House, College of Materials Science and Engineering, South China University of Technology, No. 8, Aug. 2012 (includes English abstract).

* cited by examiner

*Primary Examiner* — Hui Chin

(57) ABSTRACT

Provided are a rubber composition for tire containing raw material rubber and cellulose whiskers, and a tire produced from the same composition and having excellent general properties. Since the rubber composition for tire contains cellulose whiskers having superior reinforcing properties than rubber reinforcing materials, the rubber composition for tire can provide a tire having markedly enhanced properties compared to tires using the conventional rubber reinforcing materials. Also, when cellulose whiskers are applied to the rubber composition for tire, the content of the conventional rubber reinforcing materials can be reduced. As a result, the elongation ratio and low-fuel consumption performance that have been considered poor due to the use of conventional rubber reinforcing materials can be improved to a superior level, and a lightweight tire can be provided.

12 Claims, No Drawings

RUBBER COMPOSITION FOR TIRE TREAD AND TIRE MANUFACTURED BY USING THE SAME

BACKGROUND OF THE INVENTION

1. Field of the Invention

The present invention relates to a rubber composition for tire, a method for preparing the composition, and a tire produced using the composition. More particularly, the present invention relates to a rubber composition for tire containing cellulose whiskers, a method for preparing the composition, and a tire produced using the composition.

2. Description of the Related Art

Cellulose is a widely known biopolymer, and a biopolymer refers to a polymeric material produced from organic resources that can be regenerated. Since cellulose generally has biodegradability, cellulose can be said to be "bio-based" and "biodegradable". Cellulose is produced from naturally occurring resources, and after being used, can be decomposed into water and carbon dioxide by microorganisms living in nature. Therefore, cellulose can be said to be an environment-friendly product with less burden on the environment from production to disposal. Today, attention is increasingly paid to environment protection and countermeasures for high oil prices over the world, and biopolymer is a very innovative material from the viewpoint that the material is environment-friendly, can produce polymers from resources that can be regenerated, and can be safely disposed of without any environmental pollution.

SUMMARY OF THE INVENTION

An object of the present invention is to provide a rubber composition for tire that can provide a tire having excellent general performance, and a method for preparing the composition.

Another object of the present invention is to provide a tire produced using the rubber composition for tire described above.

In order to achieve the above objects, the rubber composition for tire according to an aspect of the present invention includes raw material rubber and cellulose whiskers.

The cellulose whiskers may have, for example, an average length of 10 nm to 50 nm. Furthermore, the cellulose whiskers may be included, for example, in an amount of 0.1 parts to 5 parts by weight relative to 100 parts by weight of the raw material rubber.

The method for preparing a rubber composition for tire according to another aspect of the present invention includes a step of dispersing cellulose whiskers in an organic solvent and thereby preparing a solution having cellulose whiskers dispersed therein; and a step of adding the solution having cellulose whiskers dispersed therein to raw material rubber.

In the step of preparing the solution having cellulose whiskers dispersed therein, any one organic solvent selected from treated distillate aromatic extract (TDAE) oil, liquid aging inhibitor, liquid rubber, and mixtures thereof can be used as the organic solvent. Furthermore, the above step can be carried out by dispersing 1 part to 30 parts by weight of cellulose whiskers in 100 parts by weight of the organic solvent. The above step may include a process of adding a surfactant additionally to the organic solvent; or a process of dispersing cellulose whiskers in the organic solvent, and ultrasonicating the dispersed solution.

The method for preparing a rubber composition for tire may further include a step of producing cellulose whiskers before the step of preparing the solution having cellulose whiskers dispersed therein.

The step of producing cellulose whiskers may include a process of hydrolyzing cellulose with an acid or a base. This step may include, for example, adding 10 parts to 30 parts by weight of cellulose to 100 parts by weight of a 40% to 70% acidic or basic aqueous solution. Furthermore, the above step may include a process of hydrolyzing cellulose with an acid or a base at 50° C. to 100° C. for 5 hours to 10 hours. The step of producing cellulose whiskers may further include a process of neutralizing the hydrolyzed reaction mixture.

The tire according to another aspect of the present invention is produced using the rubber composition for tire described above.

DETAILED DESCRIPTION OF THE PREFERRED EMBODIMENTS

Hereinafter, the present invention will be described in more detail.

The rubber composition for tire according to an embodiment of the present invention includes raw material rubber and cellulose whiskers.

The raw material rubber may be any one selected from the group consisting of natural rubber, synthetic rubber and combinations thereof.

The natural rubber may be general natural rubber, or a modified natural rubber.

Regarding the general natural rubber, any material that is known as natural rubber can be used, and there are no particular limitations on the place of origin or the like. This natural rubber contains cis-1,4-polyisoprene as a main component, but depending on the required characteristics, the natural rubber may also contain trans-1,4-polyisoprene. Therefore, the natural rubber may include a natural rubber containing cis-1,4-polyisoprene as a main component, as well as a natural rubber containing trans-1,4-isoprene as a main component, for example, balata which is a kind of rubber of sapota rubber produced in South America.

The modified natural rubber means a product obtained by modifying or purifying the general natural rubber. Examples of the modified natural rubber include epoxidized natural rubber (ENR), deproteinized natural rubber (DPNR), and hydrogenated natural rubber.

The synthetic rubber described above may be any one selected from the group consisting of styrene-butadiene rubber (SBR), modified styrene-butadiene rubber, butadiene rubber (BR), modified butadiene rubber, chlorosulfonated polyethylene rubber, epichlorohydrin rubber, fluorine rubber, silicone rubber, nitrile rubber, hydrogenated nitrile rubber, nitrile-butadiene rubber (NBR), modified nitrile-butadiene rubber, chlorinated polyethylene rubber, styrene-ethylene-butyrene-styrene (SEBS) rubber, ethylene-propylene rubber, ethylene-propylene-diene (EPDM) rubber, HYPALON rubber, chloroprene rubber, ethylene-vinyl acetate rubber, acrylic rubber, hydrin rubber, vinylbenzyl chloride-styrene-butadiene rubber, bromomethyl styrene-butyl rubber, maleic acid styrene-butadiene rubber, carboxylic acid styrene-butadiene rubber, epoxy-isoprene rubber, maleic acid ethylene-propylene rubber, carboxylic acid nitrile-butadiene rubber, brominated polyisobutyl isoprene-co-paramethyl styrene (BIMS) rubber, and combinations thereof.

Cellulose is a straight-chained polymer in which D-glucose units are linked by a (1→4)-β type glycoside bond. A number of cellulose molecules constitute a fiber, and a minimum unit thereof is called a micelle. It was found from the results of X-ray analyses that the micelles form a crystalline structure, and the connection site between a micelle and a micelle is a non-crystalline region.

The cellulose whiskers mean cellulose crystals separated from cellulose containing crystalline regions and non-crystalline regions, and the cellulose crystals have a rod-like shape similar to feline whiskers. That is, the term "cellulose whiskers" described in the present specification may be referred to as rod-shaped cellulose crystals.

The cellulose whiskers may be obtained by a conventional method that is known in the pertinent art. Among others, in order to produce cellulose whiskers having properties suitable for a rubber composition for tire, cellulose whiskers can be produced by hydrolyzing cellulose under particular conditions.

According to an embodiment, the method for producing cellulose whiskers may include hydrolysis of cellulose using an acid or a base.

In order to hydrolyze cellulose with an acid or a base, cellulose can be added to an acidic or basic aqueous solution.

The concentration of the acidic or basic aqueous solution can be adjusted to about 40% to 70%, 50% to 70%, or 55% to 65%. If the concentration of the acidic or basic aqueous solution is higher than the range described above, the amount of cellulose decomposed into glucose is increased, and if the concentration of the acidic or basic aqueous solution is lower than the range described above, hydrolysis of the non-crystalline region of cellulose may not proceed sufficiently. Therefore, cellulose whiskers can be produced at a high yield with high efficiency by controlling the concentration of the acidic or basic aqueous solution to the range described above.

For the acidic aqueous solution, for example, an aqueous hydrochloric acid solution, an aqueous sulfuric acid solution, an aqueous nitric acid solution, or mixtures thereof can be used. According to an embodiment, when an aqueous solution prepared by mixing an aqueous hydrochloric acid solution and an aqueous nitric acid solution at a weight ratio of 1:1 is used as the acidic aqueous solution, cellulose whiskers can be produced at a high yield with high efficiency.

For the basic aqueous solution, for example, an aqueous hydrogen peroxide solution, an aqueous ammonium hydroxide solution, or mixtures thereof can be used. According to an embodiment, when an aqueous solution prepared by mixing an aqueous hydrogen peroxide solution and an aqueous ammonium hydroxide solution at a weight ratio of 1:1 is used as the basic aqueous solution, cellulose whiskers can be produced at a high yield with high efficiency.

Regarding the cellulose used to produce the cellulose whiskers, any material that is employed as a cellulose material in the pertinent art can be used without any particular limitations. For example, cotton cellulose, hemicelluloses, cellulose acetate, or mixtures thereof can be used.

The cellulose used to produce cellulose whiskers may be a material that has been subjected to an appropriate pretreatment process before being adding to an acidic or basic aqueous solution. According to an embodiment, the pretreated cellulose may be a cellulose obtained by immersing cellulose in brine at normal temperature for about 12 hours to swell therein. Swollen cellulose can be hydrolyzed more effectively compared to non-swollen cellulose. The term normal temperature as used in the present specification means ambient temperature that has been neither increased nor decreased, and may mean a temperature of, for example, about 15° C. to 35° C., about 20° C. to 25° C., about 25° C., or 23° C.

The content of cellulose that is added to the acidic or basic aqueous solution may be 10 parts to 30 parts by weight, 10 parts to 20 parts by weight, 15 parts to 30 parts by weight, 15 parts to 20 parts by weight, or 17 or 18 parts by weight, relative to 100 parts by weight of the acidic or basic aqueous solution. If the content of cellulose is more than the range described above, the rate of hydrolysis is decreased, and if the content of cellulose is less than the range described above, the production efficiency is decreased. Therefore, cellulose whiskers can be produced with high efficiency in a short time by regulating the content of cellulose to the range described above.

Cellulose can be hydrolyzed into cellulose whiskers by being heat treated in the presence of an acid or a base. The temperature and time of the heat treatment are factors related to the yield and efficiency of cellulose whisker production. Thus, as the temperature and time are increased, hydrolysis of cellulose occurs actively, and as the temperature and time are decreased, hydrolysis of cellulose occurs insufficiently. In order to produce cellulose whiskers by having cellulose decomposed to an appropriate level without being decomposed to the level of glucose, it is necessary to regulate the temperature and time of the heat treatment. According to an embodiment, the acidic or basic aqueous solution containing added cellulose may be heated to, for example, 50° C. to 100° C., 60° C. to 100° C., 70° C. to 100° C., 80° C. to 100° C., or 85° C. to 95° C. Furthermore, the heat treatment may be carried out for, for example, 5 to 10 hours, 6 to 10 hours, 7 to 10 hours, 5 to 9 hours, 7 to 9 hours, or about 8 hours. If the hydrolysis temperature and time exceed the ranges described above, there is a problem that cellulose is decomposed to glucose, and the production yield may be lowered. If the hydrolysis temperature and time are less than the ranges described above, there is a problem that the hydrolysis time may be lengthened, or hydrolysis may not be sufficiently achieved. Therefore, cellulose can be hydrolyzed under the temperature time conditions in the ranges described above, and particularly, when cellulose whiskers are produced under the above-described conditions, cellulose whiskers suitable for a rubber composition for tire can be obtained.

In the method for producing cellulose whiskers, the process of adding cellulose to an acidic or basic aqueous solution, and/or the step of heat treating cellulose may be accompanied by stirring. For example, when the process of adding cellulose to an acidic or basic aqueous solution is accompanied by stirring, the process can be carried out by adding cellulose to an acidic or basic aqueous solution that is being stirred. Furthermore, for example, when the process of heat treating cellulose is accompanied by stirring, the acidic or basic aqueous solution having cellulose added thereto may be stirred during heating, and/or after heated.

When the hydrolysis of cellulose is completed, the hydrolyzed reaction mixture can be cooled. At this time, the production yield of cellulose whiskers can be prevented from being decreased, by rapidly cooling the reaction mixture. However, depending on the production method or intended properties of cellulose whiskers, the hydrolyzed reaction mixture can be sent to a subsequent treatment process without cooling.

The method for producing cellulose whiskers may further include neutralizing the hydrolyzed reaction mixture. There are no particular limitations on the method for neutralizing the reaction mixture. For example, the reaction mixture can be neutralized by washing a solid obtained by filtering the reaction mixture, with distilled water. Furthermore, as the method for neutralizing the reaction mixture, a neutralization titration method of adding an acid or a base to the reaction mixture may also be employed. In the latter case, a process of neutralizing the reaction mixture by titration and then filtering the reaction mixture can be carried out. According to an embodiment, for the method for neutralizing the reaction mixture, the latter method of filtering the reaction mixture and washing the filtered solid with distilled water can be employed in view of the production yield.

The neutralized cellulose whiskers may be completely dried in order to be incorporated into the rubber composition for tire. Regarding the method of drying the cellulose whiskers, a desiccator or the like may be used, or a vacuum drying method may be employed.

The cellulose whiskers obtained by the method described above may have an average length of about 10 nm to 50 nm, 20 nm to 50 nm, 10 nm to 40 nm, or 20 to 40 nm. Cellulose whiskers having an average length in the above-mentioned range have a highly reinforcing structure per unit volume. As a result, when such cellulose whiskers are applied to a rubber composition for tire, a tire having excellent properties that could not be traditionally obtained can be provided.

The rubber composition for tire may contain cellulose whiskers in an amount of 0.1 parts to 5 parts by weight, 0.1 parts to 4 parts by weight, 0.1 parts to 3 parts by weight, 0.5 parts to 3 parts by weight, or 1 part to 2 parts by weight, relative to 100 parts by weight of the raw material rubber. If the content of the cellulose whiskers is less than the range described above, the rubber composition for tire has insufficient reinforcing properties, and if the content is more than range described above, dispersion of the cellulose whiskers is not uniform so that other problems may occur.

Since raw material rubber itself cannot be satisfy the required properties of tire, the rubber composition for tire generally further includes a rubber reinforcing material. However, as the content of the rubber reinforcing material incorporated into the rubber composition for tire is increased, there is a problem that the mechanical properties such as elongation of tire rubber are deteriorated, and the low heat generation performance of tire is deteriorated.

These problems can be solved by incorporating highly reinforcing cellulose whiskers into the rubber composition for tire. When a small amount of cellulose whiskers are incorporated into a rubber composition for tire, even if the rubber reinforcing material is used in an amount smaller than the conventional amount, the properties that can be enhanced by rubber reinforcing materials can be secured at a level superior to the conventional level. Furthermore, the amount of incorporation of rubber reinforcing materials can be reduced so that the properties that are deteriorated by such a reduction in the amount of incorporation can be improved to a superior level. As a result, a rubber composition for tire having the cellulose whiskers incorporated therein has excellent general performance, and can provide a tire more lightweight than the conventional tires.

According to another embodiment, the rubber composition for tire can provide a tire having a quality equal to or superior to that of the conventional tires, even if a rubber reinforcing material is used in an amount of 30 parts to 45 parts by weight, or 30 parts to 40 parts by weight, relative to 100 parts by weight of the raw material rubber.

For the rubber reinforcing material, any reinforcing material that is used in the pertinent art can be used without limitation. For example, the rubber reinforcing material may be any one selected from the group consisting of carbon black, silica, calcium carbonate, clay (hydrated aluminum silicate), aluminum hydroxide, lignin, silicates, tarc, and combinations thereof.

Carbon black may have a nitrogen adsorption specific surface area (nitrogen surface area per gram, $N_2SA$) of 30 to 300 $m^2/g$, and may have a DBP (n-dibutyl phthalate) oil absorption of 60 to 180 cc/100 g. However, the present invention is not intended to be limited to these.

If the nitrogen adsorption specific surface area of the carbon black is more than 300 $m^2/g$, processability of the rubber composition for tire may become inferior, and if the nitrogen adsorption specific surface area is less than 30 $m^2/g$, the reinforcing performance imparted by carbon black may become inferior. Also, if the DBP oil absorption of carbon black is more than 180 cc/100 g, processability of the rubber composition may become inferior, and if the DBP oil absorption is less than 60 cc/100 g, the reinforcing performance imparted by carbon black may become inferior.

Representative examples of carbon black include N110, N121, N134, N220, N231, N234, N242, N293, N299, 5315, N326, N330, N332, N339, N343, N347, N351, N358, N375, N539, N550, N582, N630, N642, N650, N683, N754, N762, N765, N774, N787, N907, N908, N990, and N991.

Silica may have a nitrogen adsorption specific surface area (nitrogen surface area per gram, $N_2SA$) of 100 to 180 $m^2/g$, and may have a CTAB (cetyl trimethyl ammonium bromide) adsorption specific surface area of 110 to 170 $m^2/g$. However, the present invention is not intended to be limited to this.

If the nitrogen adsorption specific surface area of silica is less than 100 $m^2/g$, the reinforcing performance imparted by silica may become inferior, and if the nitrogen adsorption specific surface area is more than 180 $m^2/g$, processability of the rubber composition may become inferior. Furthermore, if the CTAB adsorption specific surface area of silica is less than 110 $m^2/g$, the reinforcing performance imparted by silica may become inferior, and if the CTAB adsorption specific surface area is more than 170 $m^2/g$, processability of the rubber composition may become inferior.

For the silica, silicas produced by wet methods and dry methods can all be used, and examples of commercially available products that can be used include ULTRASIL VN2 (manufactured by Degussa AG), ULTRASIL VN3 (manufactured by Degussa Ag), Z1165MP (manufactured by Rhodia S.A.), and Z165GR (manufactured by Rhodia S.A.).

When silica is used as the rubber reinforcing material, a coupling agent may be further incorporated into the rubber composition for tire, in order to increase dispersibility of the silica.

For the coupling agent, any one selected from the group consisting of a sulfide-based silane compound, a mercapto-based silane compound, a vinyl-based silane compound, an amino-based silane compound, a glycidoxy-based silane compound, a nitro-based silane compound, a chloro-based silane compound, a methacryl-based silane compound, and combinations thereof can be used, and a sulfide-based silane compound can be preferably used.

The sulfide-based silane compound may be any one selected from the group consisting of bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropyl benzothiazolyl tetrasulfide, 3-triethoxysilylpropyl benzothiazolyl tetrasulfide, 3-trimethoxysilylpropyl methacrylate monosulfide, 3-trimethoxysilylpropyl methacrylate monosulfide, and combinations thereof.

The mercaptosilane compound may be any one selected from the group consisting of 3-mercaptopropyltrimethoxysilane, 3-mercaptopropyltriethoxysilane, 2-mercaptoethyltrimethoxysilane, 2-mercaptoethyltriethoxysilane, and combinations thereof. The vinyl-based silane compound may be any one selected from the group consisting of ethoxysilane, vinyltrimethoxysilane, and combinations thereof. The amino-based silane compound may be any one selected from the group consisting of 3-aminopropyltriethoxysilane, 3-aminopropyltrimethoxysilane, 3-(2-aminoethyl)aminiopropyltriethoxysilane, 3-(2-aminoethyl)aminopropyltrimethoxysilane, and combinations thereof.

The glycidoxy-based silane compound may be any one selected from the group consisting of γ-glycidoxypropyltriethoxysilane, γ-glycidoxypropyltrimethoxysilane, γ-glycidoxypropylmethyldiethoxysilane, γ-glycidoxypropylmethyldimethoxysilane, and combinations thereof. The nitro-based silane compound may be any one selected from the group consisting of 3-nitropropyltrimethoxysilane, 3-nitropropyltriethoxysilane, and combinations thereof. The chloro-based silane compound may be any one selected from the group consisting of 3-chloropropyltrimethoxysilane, 3-chloropropyltriethoxysilane, 2-chloroethyltrimethoxysilane, 2-chloroethyltriethoxysilane, and combinations thereof.

The methacryl-based silane compound may be any one selected from the group consisting of γ-methacryloxypropyltrimethoxysilane, γ-methacryloxypropylmethyldimethoxysilane, γ-methacryloxypropyldimethylmethoxysilane, and combinations thereof.

The coupling agent may be contained in an amount of 1 part to 20 parts by weight relative to 100 parts by weight of the raw material rubber, for the purpose of enhancing dispersibility of the silica. If the content of the coupling agent is less than 1 part by weight, dispersibility enhancement of silica is achieved insufficiently so that processability of the rubber may be decreased, or the low-fuel consumption performance may be decreased. If the content is more than 20 parts by weight, the interaction between silica and rubber becomes so strong that the low-fuel consumption performance may be excellent, but the braking performance may be deteriorated significantly.

The rubber composition for tire may optionally further include various additives such as a vulcanizing agent, a vulcanization accelerator, a vulcanization accelerator aid, an aging inhibitor, a softening agent, and a tackifying agent. Regarding these various additives, any additives that are conventionally used in the art to which the present invention is pertained can be used, and their contents are determined according to the mixing ratios used in conventional rubber compositions for tire, without any particular limitations.

For the vulcanizing agent, a sulfur-based vulcanizing agent can be preferably used. Examples of the sulfur-based vulcanizing agent that can be used include inorganic vulcanizing agents such as powdered sulfur (S), insoluble sulfur (S), precipitated sulfur (S), and colloidal sulfur; and organic vulcanizing agents such as tetramethylthiuram disulfide (TMTD), tetraethylthiuram disulfide (TETD), and dithiodimorpholine. For the sulfur vulcanizing agent, specifically elemental sulfur or a vulcanizing agent that produces sulfur, for example, amine disulfide or polymeric sulfur, can be used.

It is preferable for the vulcanizing agent to be included in an amount of 0.5 parts to 4.0 parts by weight relative to 100 parts by weight of the raw material rubber, from the viewpoint that an appropriate vulcanization effect of the vulcanizing agent can make the raw material rubber less sensitive to heat and chemically stable.

The vulcanization accelerator means an accelerator that accelerates the rate of vulcanization or accelerates any delayed action in the initial vulcanization stage.

Regarding the vulcanization accelerator, any one selected from the group consisting of a sulfenamide-based accelerator, a thiazole-based accelerator, a thiuram-based accelerator, a thiourea-based accelerator, a guanidine-based accelerator, a dithiocarbamic acid-based accelerator, an aldehyde-amine-based accelerator, an aldehyde-ammonia-based accelerator, an imidazoline-based accelerator, a xanthate-based accelerator, and combinations thereof can be used.

Regarding the sulfenamide-based vulcanization accelerator, for example, any one sulfenamide-based compound selected from the group consisting of N-cyclohexyl-2-benzothiazyl sulfenamide (CBS), N-tert-butyl-2-benzothiazyl sulfenamide (TBBS), N,N-dicyclohexyl-2-benzothiazyl sulfenamide, N-oxydiethylene-2-benzothiazyl sulfenamide, N,N-diisopropyl-2-benzothiazole sulfenamide, and combinations thereof can be used.

Regarding the thiazole-based vulcanization accelerator, for example, any one thiazole-based compound selected from the group consisting of 2-mercaptobenzothiazole (MBT), dibenzothiazyl disulfide (MBTS), sodium salt of 2-mercaptobenzothiazole, zinc salt of 2-mercaptobenzothiazole, copper salt of 2-mercaptobenzothiazole, cyclohexylamine salt of 2-mercaptobenzothiazole, 2-(2,4-dinitrophenyl)mercaptobenzothiazole, 2-(2,6-diethyl-4-morpholinothio)benzothiazole, and combinations thereof can be used.

Regarding the thiuram-based vulcanization accelerator, for example, any one thiuram-based compound selected from the group consisting of tetramethylthiuram disulfide (TMTD), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide, pentamethylenethiuram tetrasulfide, and combinations thereof can be used.

Regarding the thiourea-based vulcanization accelerator, for example, any one thiourea-based compound selected from the group consisting of thiacarbamide, diethylthiourea, dibutylthiourea, trimethylthiourea, di-ortho-tolylthiourea, and combinations thereof can be used.

Regarding the guanidine-based vulcanization accelerator, for example, any one guanidine-based compound selected from the group consisting of diphenylguanidine, di-ortho-tolylguanidine, triphenylguanidine, ortho-tolylbiguanide, diphenylguanidine phthalate, and combinations thereof can be used.

Regarding the dithiocarbamic acid-based vulcanization accelerator, for example, any one dithiocarbamic acid-based compound selected from the group consisting of zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, complex salt of zinc pentamethylenedithiocarbamate and piperidine, zinc hexadecylisopropyldithiocarbamate, zinc octadecylisopropyldithiocarbamate, zinc dibenzyldithiocarbamate, sodium diethyldithiocarbamate, piperidine pentamethylenedithiocarbamate, selenium dimethyldithiocarbamate, tellurium diethyldithiocarbamate, cadmium diamyldithiocarbamate, and combinations thereof can be used.

Regarding the aldehyde-amine-based or aldehyde-ammonia-based vulcanization accelerator, for example, any aldehyde-amine-based or aldehyde-ammonia-based compound selected from the group consisting of an acetaldehyde-aniline reaction product, a butylaldehyde-aniline compound, hexamethylenetetramine, an acetaldehyde-ammonia reaction product, and combinations thereof can be used.

Regarding the imidazoline-based vulcanization accelerator, for example, an imidazoline-based compound such as 2-mercaptoimidazoline can be used, and regarding the xanthate-based vulcanization accelerator, for example, a xanthate-based compound such as zinc dibutylxanthogenate can be used.

The vulcanization accelerator may be included in an amount of 0.5 parts to 4.0 parts by weight relative to 100 parts by weight of the raw material rubber, in order to increase productivity through the acceleration of the vulcanization rate and to enhance the rubber properties.

The vulcanization accelerator aid is a mixing agent used in combination with the vulcanization accelerator in order to complete the accelerating effect of the vulcanization accelerator. Any one selected from the group consisting of inorganic vulcanization accelerator aid, organic vulcanization accelerator aid, and combinations thereof can be used.

For the inorganic vulcanization accelerator aid, any one selected from the group consisting of zinc oxide (ZnO), zinc carbonate, magnesium oxide (Mg), lead oxide, potassium hydroxide, and combinations thereof can be used. For the organic vulcanization accelerator aid, any one selected from the group consisting of stearic acid, zinc stearate, palmitic acid, linoleic acid, oleic acid, lauric acid, dibutylammonium oleate, derivatives thereof, and combinations thereof can be used.

Particularly, zinc oxide and stearic acid can be used together as the vulcanization accelerator aid, and in this case, zinc oxide dissolves in stearic acid and forms an effective complex with the vulcanization accelerator. This complex produces free sulfur during the vulcanization reaction, and thereby facilitates a cross-linking reaction of rubber.

When zinc oxide and stearic acid are used together, these compounds can be used in an amount of 1 part to 5 parts by weight and 0.5 parts to 3 parts by weight, respectively, relative to 100 parts by weight of the raw material rubber, in order for the compounds to play the roles as appropriate vulcanization accelerator aids. If the contents of zinc oxide and stearic acid are less than the ranges described above, the vulcanization rate is slowed, and productivity may be decreased. If the contents are more than the ranges described above, a scorching phenomenon may occur, and the rubber properties may be deteriorated.

The softening agent is added to a rubber composition in order to facilitate processing by imparting plasticity to rubber or to decrease the hardness of vulcanized rubber, and means an oily material used at the time of rubber blending or rubber production. The softening agent means a process oil, or an oil that is included in other rubber compositions. For the softening agent, any one selected from the group consisting of petroleum-based oil, plant oils and fats, and combinations thereof can be used; however, the present invention is not intended to be limited to these.

Regarding the petroleum-based oil, any one selected from the group consisting of paraffinic oils, naphthene-based oils, aromatic oils, and combinations thereof can be used.

Representative examples of the paraffinic oils include P-1, P-2, P-3, P-4, P-5, and P-6 manufactured by Michang Oil Industry Co., Ltd.; representative examples of the naphthene-based oils include N-1, N-2, and N-3 manufactured by Michang Oil Industry Co., Ltd.; and representative examples of the aromatic oils include A-2 and A-3 manufactured by Michang Oil Industry Co., Ltd.

However, along with the recent rise in environmental awareness, it is known that when the content of polycyclic aromatic hydrocarbons (hereinafter, referred to as PAH's) in the aromatic oils is 3% by weight or more, the possibility of cancer induction is high. Therefore, treated distillate aromatic extract (TDAE) oil, mild extraction solvate (MES) oil, residual aromatic extract (RAE) oil, or heavy naphthenic oil can be preferably used.

Particularly, regarding the oil used as the softening agent, a TDAE oil having a total content of PAH components of 3% by weight or less relative to the total amount of the oil, having a dynamic viscosity of 95 or more (210° F. SUS), and containing 15% to 25% by weight of aromatic components, 27% to 37% by weight of naphthene-based components, and 38% to 58% by weight of paraffinic components in the softening agent, can be preferably used.

The TDAE oil makes the low temperature characteristics and fuel consumption performance of a tire containing the TDAE oil, and also has advantageous characteristics in terms of environmental factors such as the possibility of cancer induction of PAH's.

Regarding the plant oils and fats, any one selected from the group consisting of castor oil, cotton seed oil, flaxseed oil, canola oil, soybean oil, palm oil, coconut oil, peanut oil, pine oil, pine tar, tall oil, corn oil, rice bran oil, safflower oil, sesame oil, olive oil, sunflower oil, palm kernel oil, camellia oil, jojoba oil, macadamia nut oil, safflower oil, tung oil, and combinations thereof can be used.

It is preferable to use the softening agent in an amount of 0 to 150 parts by weight relative to 100 parts by weight of the raw material rubber, from the viewpoint of improving processability of the raw material.

The aging inhibitor is an additive used to terminate a chain reaction in which a tire is automatically oxidized by oxygen. Regarding the aging inhibitor, any one selected from the group consisting of amine-based agents, phenolic agents, quinoline-based agents, imidazole-based agents, carbamic acid metal salts, waxes, and combinations thereof can be appropriately selected and used.

Regarding the amine-based aging inhibitor, N-phenyl-N'-(1,3-dimethyl)-p-phenylenediamine, N-(1,3-dimethylbutyl)-N'-phenyl-p-phenylenediamine, N-phenyl-N'-isopropyl-p-phenylenediamine, N,N'-diphenyl-p-phenylenediamine, N,N'-diaryl-p-phenylenediamine, N-phenyl-N'-cyclohexyl-p-phenylenediamine, N-phenyl-N'-octyl-p-phenylenediamine, and combination thereof can be used. Regarding the phenolic aging inhibitor, any one selected from the group consisting of 2,2'-methylenebis(4-methyl-6-tert-butylphenol), 2,2'-isobutylidenebis(4,6-dimethylphenol), 2,6-di-t-butyl-p-cresol, and combinations thereof can be used. Regarding the quinoline-based aging inhibitor, 2,2,4-trimethyl-1,2-dihydroquinoline and derivatives thereof can be used, and specifically, any one selected from the group consisting of 6-ethoxy-2,2,4-trimethyl-1,2-dihydroquinoline, 6-anilino-2,2,4-trimethyl-1,2-dihydroquinoline, 6-dodecyl-2,2,4-trimethyl-1,2-dihydroquinoline, and combinations thereof can be used. Regarding the wax, waxy hydrocarbons can be preferably used.

Regarding the aging inhibitor, in addition to the aging preventing action, when conditions that the aging inhibitor should have high solubility in rubber, should have low volatility, should be inactive to rubber, and should not inhibit vulcanization are considered in addition to the aging inhibitory action, the aging inhibitor may be included in an amount of 1 part to 15 parts by weight relative to 100 parts by weight of the raw material rubber.

The tackifying agent further enhances the tack performance between rubber and rubber, improves miscibility, dispersibility and processability of other additives such as filler, and thereby contributes to an enhancement of the properties of rubber.

Regarding the tackifying agent, natural resin-based tackifying agents such as a rosin-based resin and a terpene-based resin, and synthetic resin-based tackifying agents such as a petroleum resin, coal tar, and an alkylphenol-based resin can be used.

The rosin-based resin may be any one selected from the group consisting of rosin resins, rosin ester resins, hydrogenated rosin ester resins, derivatives thereof, and combinations thereof. The terpene-based resin may be any one selected from the group consisting of terpene resins, terpene phenolic resins, and combinations thereof.

The petroleum resin may be any one selected from the group consisting of aliphatic resins, acid-modified aliphatic resins, alicyclic resins, hydrogenated alicyclic resins, aromatic (C9) resins, hydrogenated aromatic resins, C5-C9 copolymer resins, styrene resins, styrene copolymer resins, and combinations thereof.

The coal tar may be a coumarone-indene resin.

The alkylphenolic resin may be a p-tert-alkylphenol formaldehyde resin or a resorcinol formaldehyde resin, and the p-tert-alkylphenol formaldehyde resin may be any one selected from the group consisting of p-tert-butylphenol formaldehyde resin, p-tert-octylphenol formaldehyde resin, and combinations thereof.

The tackifying agent may be included in an amount of 2 parts to 4 parts by weight relative to 100 parts by weight of the raw material rubber. If the content of the tackifying agent is less than 2 parts by weight relative to 100 parts by weight of the raw material rubber, the adhesive performance may be deteriorated, and if the content is more than 4 parts by weight, rubber properties may be deteriorated.

The rubber composition for tire may be included in various rubber constituent elements that constitute a tire. Examples of the rubber constituent elements include tread (tread cap and tread base), side wall, side wall insertions, apex, chafer, wire coat, and inner liner.

The method for preparing a rubber composition for tire according to another embodiment of the present invention includes adding cellulose whiskers to raw material rubber. The raw material rubber may be raw material rubber itself, or may be raw material rubber contained in a rubber composition for tire.

Since cellulose whiskers contain a large amount of hydrophilic groups, it is difficult to uniformly incorporate cellulose whiskers into hydrophobic raw material rubber or a rubber composition for tire containing the raw material rubber.

Therefore, in order to facilitate dispersion of cellulose whiskers in raw material rubber or a rubber composition containing the raw material rubber, the method for preparing a rubber composition for tire may include a step of dispersing cellulose whiskers in an organic solvent and thereby preparing a solution having cellulose whiskers dispersed therein.

The organic solvent is selected from the components that are included in a rubber composition for tire so that cellulose whiskers can be incorporated into the rubber composition for tire without affecting the general properties of a tire.

Examples of the organic solvent that can be used include TDAE oil, a liquid aging inhibitor, liquid rubber, and mixtures thereof.

The content of cellulose whiskers incorporated into the organic solvent may be 1 part to 30 parts by weight relative to 100 parts by weight of the organic solvent. If the amount of the cellulose whiskers is more than the range described above, there is a problem that dispersion in the organic solvent is not easily achieved, and if the amount is less than the range described above, the organic solvent is included in an excess amount in the rubber composition for tire, and the organic solvent may adversely affect the general performance of the tire.

Furthermore, the organic solvent may additionally contain a surfactant in order to increase the dispersity of cellulose whiskers.

Regarding the surfactant, anionic, cationic or amphoteric surfactants that are generally usable can all be used. According to an embodiment, it is advantageous to use an anionic surfactant as the surfactant, for enhancing the dispersity of cellulose whiskers.

The surfactant may be included, for example, in an amount of 1 part to 10 parts by weight relative to 100 parts by weight of the organic solvent. If the content of the surfactant is less than the range described above, the extent of enhancement of dispersity brought by the surfactant is negligible, and if the content is more than the range described above, there is a problem that the dispersion efficiency is decreased.

Furthermore, in order to further enhance the dispersity of cellulose whiskers in the organic solvent, the step of preparing a solution having cellulose whiskers dispersed therein may include dispersing cellulose whiskers in the organic solvent and ultrasonicating the dispersed solution.

The ultrasonication treatment can be carried out using an ultrasonic disperser. For this process, any ultrasonic disperser that is used in the pertinent art can be used without limitation. Examples of the ultrasonic disperser that can be used include a horn type ultrasonic disperser and a bath type ultrasonic disperser. In the case of using a horn type ultrasonic disperser, the organic solvent containing added cellulose whiskers may be ultrasonicated at a power of about 500 W/liter for about one hour. Furthermore, in the case of using a bath type ultrasonic disperser, the organic solvent containing added cellulose whiskers may be ultrasonicated in hard water or distilled water at about 10° C. to 25° C. at a power of about 100 W/liter for about 4 hours. In the case of the bath type ultrasonic disperser, if the temperature of water is adjusted beyond the range described above, there is a problem of reduced dispersion efficiency.

The method for preparing a rubber composition for tire may further include a step of producing cellulose whiskers before the step of preparing a solution having cellulose whiskers dispersed therein. The step of producing cellulose whiskers may be carried out with reference to the method for producing cellulose whiskers described above.

Furthermore, the method for preparing a rubber composition for tire may further include a step of adding the solution having cellulose whiskers dispersed therein to raw material rubber, subsequently to the step of preparing a solution having cellulose whiskers dispersed therein. The raw material rubber may be raw material rubber itself, or may be raw material rubber included in a rubber composition or tire. In regard to the specific components and kinds of the raw material rubber and the rubber composition for tire, reference may be made to the descriptions given above.

The method for preparing a rubber composition for tire can be carried out by employing the techniques employed in the pertinent art without any limitation, in addition to the subject matters described above. For example, the rubber composition for tire can be prepared through a conventional two-stage continuous production process. That is, the rubber composition for tire can be prepared in an appropriate mixer using a first step of performing a thermomechanical treatment or kneading at a maximum temperature of 110° C. to 190° C., and preferably at a high temperature of 130° C. to 180° C., and a second stage of performing a mechanical treatment typically at a temperature lower than 110° C., for example, 40° C. to 100° C., during a finish stage in which the crosslinked system is mixed. However, the present invention is not intended to be limited to this.

The tire according to another embodiment of the present invention is produced using the rubber composition for tire described above. Regarding the method for producing a tire using the rubber composition for tire, any method conventionally used in the production of tires can be applied, and detailed description will not be given in this specification.

The tire may be a tire for passenger cars, a tire for racing cars, an airplane tire, a tire for agricultural machines, a tire for off-the-road vehicles, a truck tire, a bus tire, or the like. Also, the tire may be a radial tire or a bias tire, and a radial tire is preferred for the purpose of the present invention.

The rubber composition for tire of the present invention can provide a tire having excellent general properties. Specifically, since the rubber composition for tire contains cellulose whiskers that have superior reinforcing properties than rubber reinforcing materials, a tire having markedly enhanced properties compared to tires using the conventional rubber reinforcing materials can be provided. Furthermore, when cellulose whiskers are applied to a rubber composition for tire, the content of the conventional rubber reinforcing materials can be reduced. As a result, elongation ratio, low-fuel consumption performance and the like that have been considered poor due to the use of conventional rubber reinforcing materials can be improved to a superior level, and a lightweight tire can be provided.

EXAMPLES

Hereinafter, the present invention will be described in detail by way of Examples so that a person having ordinary skill in the art to which the present invention is pertained, can easily carry out the invention. However, the present invention can be realized in various different embodiments and is not intended to be limited only to the Examples described herein.

Production Example

Production of Cellulose Whiskers and Rubber Composition for Tire

Production Example 1

Production of Cellulose Whiskers

Cotton cellulose was immersed in brine at normal temperature for 12 hours, and thus swollen cotton cellulose was prepared. Furthermore, apart from the pretreatment of cellulose, an acidic aqueous solution was prepared by mixing a 60% aqueous hydrochloric acid solution and a 60% aqueous nitric acid solution at a weight ratio of 1:1.

18 parts by weight of the swollen cotton cellulose was added to 100 parts by weight of the acidic aqueous solution. The acidic aqueous solution having cellulose added therein was heat treated using a hot plate at a temperature of about 90° C. for about 8 hours. Thereafter, the reaction vessel containing the heat treated solution was submerged in a water bath containing water at about 20° C., and thus the heat treated solution was rapidly cooled. Subsequently, the cooled solution was filtered, and the cellulose whiskers thus filtered were neutralized by washing with distilled water. The separated cellulose whiskers were completely dried in a desiccator for 4 hours, and thus cellulose whiskers having an average length of 20 nm to 40 nm were obtained.

Production Example 2

Preparation of Rubber Composition 18 parts by weight of the cellulose whiskers produced as described above and 5 parts by weight of an alkylbenzenesulfonic acid salt as an anionic surfactant were added to 100 parts by weight of TDAE oil. Subsequently, the cellulose whiskers were dispersed in the TDAE oil using a bath type ultrasonic disperser, and thus a solution having cellulose whiskers dispersed therein was prepared. At this time, the temperature of water in the disperser was about 25° C., and the dispersing time was about 4 hours.

Rubber compositions for tire of Examples and Comparative Examples were prepared at the composition ratios indicated in the following Table 1, using the above-prepared solution having cellulose whiskers dispersed therein. Preparation of the rubber compositions was carried out according to a conventional method for preparing a rubber composition.

TABLE 1

| | Example 1 | Example 2 | Comparative Example 1 | Comparative Example 2 |
|---|---|---|---|---|
| Raw material rubber [1] | 100 | 100 | 100 | 100 |
| Carbon black [2] | 40 | 40 | 50 | 40 |
| Cellulose whiskers | 1 | 2 | — | — |
| TDAE oil | 5.5 | 11 | — | — |
| Surfactant [3] | 0.278 | 0.556 | — | — |
| Zinc oxide | 4 | 4 | 4 | 4 |
| Stearic acid | 2 | 2 | 2 | 2 |
| Aging inhibitor | 2 | 2 | 2 | 2 |
| Sulfur | 2 | 2 | 2 | 2 |
| Vulcanization accelerator | 1 | 1 | 1 | 1 |

(unit: parts by weight)
[1] Raw material rubber: natural rubber
[2] Carbon black: N220
[3] Surfactant: Alkylbenzenesulfonic acid salt Experimental Example Analysis of Properties of Rubber Compositions The properties of the rubber compositions prepared in Examples and Comparative Examples were analyzed, and the results are presented in the following Table 2.

TABLE 2

| | | Example 1 | Example 2 | Comparative Example 1 | Comparative Example 2 |
|---|---|---|---|---|---|
| Tensile properties | Hardness | 70 | 66 | 61 | 74 |
| | 300% modulus | 182 | 170 | 140 | 198 |

TABLE 2-continued

|  |  | Example 1 | Example 2 | Comparative Example 1 | Comparative Example 2 |
|---|---|---|---|---|---|
|  | Tensile strength | 297 | 260 | 202 | 312 |
|  | Elongation ratio | 462 | 440 | 620 | 494 |
| LB abrasion | Degree of abrasion resistance | 110 | 100 | 81 | 120 |
| Hysteresis | 60° C. tanδ (Index) | 113 | 100 | 120 | 110 |

(1) The hardness is a value measured with a Shore A type hardness meter. Hardness represents steering stability, and a higher value thereof indicates superior steering stability.

(2) The 300% modulus (unit: kgf/cm$^2$) is the tensile strength at a 300% elongation, and was measured according to ISO 37. A higher value thereof indicates superior strength.

(3) The tensile strength (unit: kgf/cm$^2$) was measured according to the method of ASTM D790. A higher value thereof indicates superior strength.

(4) The elongation at break (unit: %) represents the strain value, expressed in percentage (%), at the time point when the specimen ruptures in a tensile testing machine.

(5) The degree of abrasion resistance is the ratio of Lambourn abrasion, and is an index value calculated relative to the amount of loss of a rubber specimen obtained from the rubber composition of Comparative Example 1, which was designated as 100. The amount of loss of a rubber specimen was determined by rotating the rubber specimen at normal temperature at a slip ratio of 25% under a load of 1.5 kg, and measuring the amount of abraded rubber. A higher value of the abrasion resistance indicates superior abrasion resistance performance.

(6) The 60° C. tan δ represents the low-fuel consumption characteristic of a tire. This was determined by measuring G', G", and tan δ at 0.5% strain and at a frequency of 10 Hz in a temperature range of from −60° to 60° C. using an ARES rheometer. The value of 60° C. tan δ is an index value calculated relative to the value of Comparative Example 1, which was designated as 100. A higher index value thereof indicates superior rolling resistance performance (low-fuel consumption performance).

When Comparative Example 1 and Comparative Example 2 are compared, a tendency was confirmed that the tensile properties and abrasion resistance of the tire rubbers increased as the content of carbon black increased. However, Example 1 and Example 2 in which cellulose whiskers were applied to the rubber compositions for tire, exhibited superior tensile properties and abrasion resistance compared to Comparative Example 1 which used a larger amount of carbon black than in Examples.

Furthermore, when Comparative Examples 1 and 2 were compared, it was confirmed that when a large amount of carbon black is incorporated into the rubber composition in order to secure appropriate tensile properties and abrasion resistance of the tire rubber, elongation ratio and hysteresis are deteriorated. However, Examples 1 and 2 have enhanced general performance of the tire rubber even though a smaller amount of carbon black is used as compared to the conventional rubber compositions. Therefore, it was verified that even the elongation ratio and hysteresis that exhibit inferior performance as the content of carbon black is increased, can be secured at a superior level.

Preferred embodiments of the present invention have been described in detail in the above. However, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for preparing a rubber composition for tire, the method comprising:
   dispersing cellulose whiskers in an organic solvent, and preparing a solution having cellulose whiskers dispersed therein; and
   adding the solution having cellulose whiskers dispersed therein, to raw material rubber,
   wherein the process of producing cellulose whiskers includes hydrolyzing cellulose with an acid or a base at a temperature range greater than 60° C. and equal to or less than 100° C. for 5 hours to 10 hours.

2. The method for preparing a rubber composition for tire according to claim 1, wherein the process of preparing the solution having cellulose whiskers dispersed therein uses any one organic solvent selected from treated distillate aromatic extract (TDAE) oil, a liquid aging inhibitor, a liquid rubber, and mixtures thereof.

3. The method for preparing a rubber composition for tire according to claim 1, wherein the process of preparing a solution having cellulose whiskers dispersed therein, includes dispersing cellulose whiskers in an amount of 1 part to 30 parts by weight relative to 100 parts by weight of the organic solvent.

4. The method for preparing a rubber composition for tire according to claim 1, wherein the process of preparing a solution having cellulose whiskers dispersed therein, includes further adding a surfactant to the organic solvent.

5. The method for preparing a rubber composition for tire according to claim 1, wherein the process of preparing a solution having cellulose whiskers dispersed therein, includes dispersing cellulose whiskers in the organic solvent, and ultrasonicating the dispersed solution.

6. The method for preparing a rubber composition for tire according to claim 1, further comprising a process of producing cellulose whiskers before the process of preparing a solution having cellulose whiskers dispersed therein.

7. The method for preparing a rubber composition for tire according to claim 6, wherein the process of producing cellulose whiskers includes hydrolyzing cellulose with an acid or a base.

8. The method for preparing a rubber composition for tire according to claim 6, wherein the process of producing cellulose whiskers includes adding 10 parts to 30 parts by weight of cellulose to 100 parts by weight of a 40% to 70% acidic or basic aqueous solution.

9. The method for preparing a rubber composition for tire according to claim 6, wherein the process of producing cellulose whiskers further includes neutralizing the hydrolyzed reaction mixture.

10. The method for preparing a rubber composition for tire according to claim 1, wherein the process of preparing the solution having cellulose whiskers dispersed therein uses a liquid rubber as the organic solvent.

11. The method for preparing a rubber composition for tire according to claim 1, wherein the process of preparing the solution having cellulose whiskers dispersed therein uses the organic solvent chosen from a liquid aging inhibitor, a liquid rubber, and mixtures thereof.

12. The method for preparing a rubber composition for tire according to claim 11, wherein the liquid aging inhibitor comprises at least one compound chosen from a group consisting of amine-based agents, phenolic agents, quinoline-based agents, imidazole-based agents, carbamic acid metal salts, and waxes.

* * * * *